US007823465B2

(12) United States Patent
Makimae et al.

(10) Patent No.: US 7,823,465 B2
(45) Date of Patent: Nov. 2, 2010

(54) BOLT FASTENING METHOD AND APPARATUS

(75) Inventors: Tatsumi Makimae, Hiroshima (JP); Yutaka Fujii, Hiroshima (JP)

(73) Assignee: Mazda Motor Corporation (JP)

( * ) Notice: Subject to any disclaimer, the term of this patent is extended or adjusted under 35 U.S.C. 154(b) by 79 days.

(21) Appl. No.: 12/189,860

(22) Filed: Aug. 12, 2008

(65) Prior Publication Data

US 2009/0084231 A1 Apr. 2, 2009

(30) Foreign Application Priority Data

Sep. 28, 2007 (JP) ............................. 2007-254789

(51) Int. Cl.
*B23Q 17/00* (2006.01)
*G01D 1/00* (2006.01)
*E21B 7/00* (2006.01)

(52) U.S. Cl. ..................... 73/862.23; 173/2; 29/407.02; 29/407.03

(58) Field of Classification Search . 73/862.23–862.24; 29/407.03; 700/275; 318/432; 173/176, 173/183, 2
See application file for complete search history.

(56) References Cited

U.S. PATENT DOCUMENTS

| 4,987,669 | A | 1/1991 | Makimae et al. |
| 5,837,907 | A * | 11/1998 | Ohmi et al. ............... 73/862.23 |
| 6,954,682 | B2 * | 10/2005 | Makimae et al. ............ 700/275 |
| 7,398,700 | B2 * | 7/2008 | Makimae et al. ......... 73/862.24 |
| 2004/0027082 | A1 | 2/2004 | Makimae et al. |
| 2006/0218768 | A1 | 10/2006 | Makimae et al. |
| 2007/0006444 | A1 * | 1/2007 | Makimae et al. ......... 29/407.01 |

FOREIGN PATENT DOCUMENTS

JP 2004258644 A 9/2004

OTHER PUBLICATIONS

Mario Garella, European Search Report, EP 08015065, Dec. 5, 2008.

* cited by examiner

*Primary Examiner*—Lisa M Caputo
*Assistant Examiner*—Jonathan Dunlap
(74) *Attorney, Agent, or Firm*—Studebaker & Brackett PC; Donald R. Studebaker

(57) ABSTRACT

A bolt is fastened up to a predetermined snug torque Ts and then the bolt is further fastened by a specified angle θt from a bolt angle corresponding to the snug torque Ts. Herein, in order to obtain excess and deficiency of the fastening angle up to the snug torque Ts, an angle-variation difference between the fastening angle θsb of the bolt at the point where the fastening torque of the bolt has reached the snug torque Ts and a standard angle θsa of the snug torque Ts is calculated. And, addition of this angle-variation difference to a base angle is set as the new specified angle θt to correct the excess and deficiency. Accordingly, variation in a fastening shaft force can be restrained even if the snug torque is set at a relatively high torque in the bolt fastening method using the torque+angle method.

7 Claims, 13 Drawing Sheets

| | Fastening Angle at Ts | Δθ | Fastening Angle | Bolt Shaft Force F | Average / Variation |
|---|---|---|---|---|---|
| a (Standard Bolt) | $\theta_{sa}$=58deg (Standard Angle) | — | $Ts+\theta k$ | 37kN | 36.5kN / Δ3kN |
| b | $\theta_{sb}$=52deg | +6deg | $Ts+\theta k+6deg$ | 38kN | |
| c | $\theta_{sc}$=40deg | +18deg | $Ts+\theta k+18deg$ | 36kN | |
| d | $\theta_{sd}$=36deg | +22deg | $Ts+\theta k+22deg$ | 35kN | |

FIG. 5

|   | Fastening Shaft Force | Average / Variation |
|---|---|---|
| a | 37kN | 32.3kN / Δ10kN |
| b | 36kN | |
| c | 29kN | |
| d | 27kN | |

BOLT FASTENING METHOD AND APPARATUS

BACKGROUND OF THE INVENTION

The present invention relates to a bolt fastening method and apparatus.

A bolt fastening method (torque method) in which the bolt fastening management is conducted by utilizing the proportional relationship between the fastening torque T and the fastening shaft force (in the bolt elasticity area) is known. While this torque method is superior in work efficiency, there may occur a large variation in the fastening shaft force according to the coefficient of friction between the screw face and the seat face of the bolt (see FIG. 11). Accordingly, another bolt fastening method (torque+angle method), which is shown in US Patent Application Publication No. 2006/0218768, has been used, in which the bolt is fastened up to the predetermined snug torque Ts (a fastening torque at a start point for an effective and substantial fastening) and then the bolt is further rotated (fastened) by a specified angle θk from the standard bolt angle corresponding to the snug torque Ts, thereby restraining improper influence of the above-described coefficient of friction (between the screw face and the seat face). According to this bolt fastening method, since the bolt fastening management is conducted only with the bolt fastening angle (rotational angle) θk after the bolt fastening up to the snug torque Ts, a fastening shaft force F based on the bolt fastening angle θk, which is different from the torque method, may receive little influence of the coefficient of friction during the bolt fastening.

In the above-described bolt fastening method (torque+angle method), however, there may occur the variation in the fastening shaft force according to the coefficient of friction (between the screw face and the seat face) in the fastening area before reaching the snug torque Ts, which may improperly affect the fastening shaft force F of the fastening after the fastening point of the snug torque Ts (see FIG. 12). In this case, while it may be considered to set the snug torque Ts at a very low torque for the purpose of restraining the variation of the fastening shaft force (fastening angle) at the snug torque Ts, there occurs necessity to cope with restrictions of fastening conditions (for example, there is a problem in that it may be recognized by mistake to have reached the snug torque due to dusts being stuck or the like). Thereby, the above-described setting would not be sufficient.

SUMMARY OF THE INVENTION

The present invention has been devised in view of the above-described matters, and an object of the present invention is to provide a bolt fastening method which can properly restrain the variation in the fastening shaft force even if the snug torque is set at a relatively high torque in the torque+angle method. Another object of the present invention is to provide a bolt fastening apparatus which uses the above-described bolt fastening method.

According to a first aspect of the present invention, there is provided a bolt fastening method, in which a bolt is fastened up to a predetermined snug torque and then the bolt is further fastened by a specified angle from a bolt angle corresponding to the snug torque, the method comprising steps of obtaining a fastening-angle start standard point based on torque characteristics of fastening of the bolt, obtaining a fastening angle of the bolt at a point where a fastening torque of the bolt has reached a snug torque from the fastening-angle start standard point, obtaining an angle-variation difference between a standard angle of the snug torque and the fastening angle of the bolt at the point where the fastening torque of the bolt has reached the snug torque, and setting the specified angle at a certain amount of angle which is obtained by adding the angle-variation difference to a base angle.

According to the present invention, the specified angle for the bolt to be further fastened from the bolt angle corresponding to the snug torque is properly corrected (updated), so that the final fastening shaft force of the bolt can be made uniform. Thereby, the variation in the fastening shaft force can be restrained properly even if the snug torque is set at the relatively high torque.

According to an embodiment of the first aspect of the present invention, one of a plurality bolts to be fastened is selected as a standard bolt, and the obtained fastening angle of the standard bolt at the point where the fastening torque of the bolt has reached the snug torque from the fastening-angle start standard point is used as the standard angle of the snug torque. Thereby, the fastening shaft force of the other bolt than the standard bolt can be made approximate the fastening shaft force of the standard bolt easily, and the fastening shaft forces of all of the bolts can be made uniform.

According to another embodiment of the first aspect of the present invention, the obtaining of the fastening angle of the bolt at the point where the fastening torque of the bolt has reached the snug torque from the fastening-angle start standard point is conducted for a plurality bolts to be fastened, an average angle of the obtained fastening angles of the plurality of bolts is obtained, and the average angle is used as the standard angle of the snug torque. Thereby, the correction of the fastening shaft force of the bolts can be properly achieved regardless of presence of the plural bolts to be fastened, so that the fastening shaft forces of the plural bolts can be made uniform.

According to another embodiment of the first aspect of the present invention, the plurality of bolts for obtaining the average angle are part of bolts which are selected from all of the bolts to be fastened. Thereby, even if there are many bolts, the average angle are easily obtained, and the correction is made based on the average angle, thereby making the fastening shaft forces of the plural bolts uniform. Further, the fastening angle of the specified bolt which is largely different from the one of the other bolt(s) may be excluded from averaging, so that more appropriate average angle can be used to provide the proper fastening, considering the situation of an object product to be fastened with the bolts.

According to another embodiment of the first aspect of the present invention, the selected plural bolts are fastened substantially at the same time, respective fastening angles of the bolts at the points where the fastening torques of the bolts have reached the snug torques from the fastening-angle start standard points are obtained, and the average angle is obtained from the respective fastening angles obtained. Thereby, the fastening shaft forces of the plural bolts can be made uniform, achieving the efficient fastening step of the bolts According to a second aspect of the present invention, there is provided a bolt fastening apparatus, in which a bolt is fastened up to a predetermined snug torque and then the bolt is further fastened by a specified angle from a bolt angle corresponding to the snug torque, the apparatus comprising a bolt-fastening adjusting means for adjusting fastening of the bolt, an angle-start-standard-point calculating means for obtaining a fastening-angle start standard point based on torque characteristics of fastening of the bolt, a snug-torque-point angle detecting means for obtaining a fastening angle of the bolt at a point where a fastening torque of the bolt has reached a snug torque from the fastening-angle start standard point obtained by the angle-start-standard-point calculating means, an angle-variation difference calculating means for obtaining an angle-variation difference between the fastening angle of the bolt obtained by the snug-torque-point angle detecting means and a standard angle of the snug torque, a specified-angle setting means for setting the specified angle at a certain amount of angle which is obtained by adding the angle-variation difference obtained by the angle-variation difference calculating means to a base angle, and a control means for controlling the bolt-fastening adjusting means such that the bolt is further fastened by the specified angle with the certain amount of angle which is set by the specified-angle setting means.

According to an embodiment of the second aspect of the present invention, the snug-torque-point angle detecting means is configured to detect the fastening angle of each of a plurality of bolts to be fastened at the point where the fastening torque of the bolt has reached the snug torque, there is provided a standard-angle setting means for setting the fastening angle of one specified bolt of the plural bolts, which is detected by the snug-torque-point angle detecting means, as the standard angle of the snug torque, and the angle-variation difference calculating means is configured to obtain a difference between the fastening angle of the other bolt than the one specified bolt which is obtained by the snug-torque-point angle detecting means and the standard angle set by the standard-angle setting means as the angle-variation difference.

According to another embodiment of the second aspect of the present invention, the snug-torque-point angle detecting means is configured to detect the fastening angle of each of a plurality of bolts to be fastened at the point where the fastening torque of the bolt has reached the snug torque, there is provided an average-angle calculating means for calculating an average angle of the fastening angles of the plurality of bolts at the point where the fastening torque of each of the bolts has reached the snug torque, which are detected by the snug-torque-point angle detecting means, as the standard angle of the snug torque, and the angle-variation difference calculating means is configured to obtain a difference between the fastening angle of the bolt which is obtained by the snug-torque-point angle detecting means and the average angle calculated by the average-angle calculating means as the angle-variation difference.

According to another embodiment of the second aspect of the present invention, the control means is configured to control the bolt-fastening adjusting means such that fastening of the plural bolts up to the snug torque is started substantially at the same time.

Thereby, the bolt fastening apparatus using the bolt fastening method of the first aspect of the present invention can be provided.

Other features, aspects, and advantages of the present invention will become apparent from the following description which refers to the accompanying drawings.

BRIEF DESCRIPTION OF THE DRAWINGS

FIG. 5 is a diagram showing specific results of the experiment of FIG. 4.

DETAILED DESCRIPTION OF THE INVENTION

Hereinafter, preferred embodiments of the present invention will be described referring to the accompanying drawings.

Embodiment 1

77A bolt fastening method according to a first embodiment will be described

Figure 11:
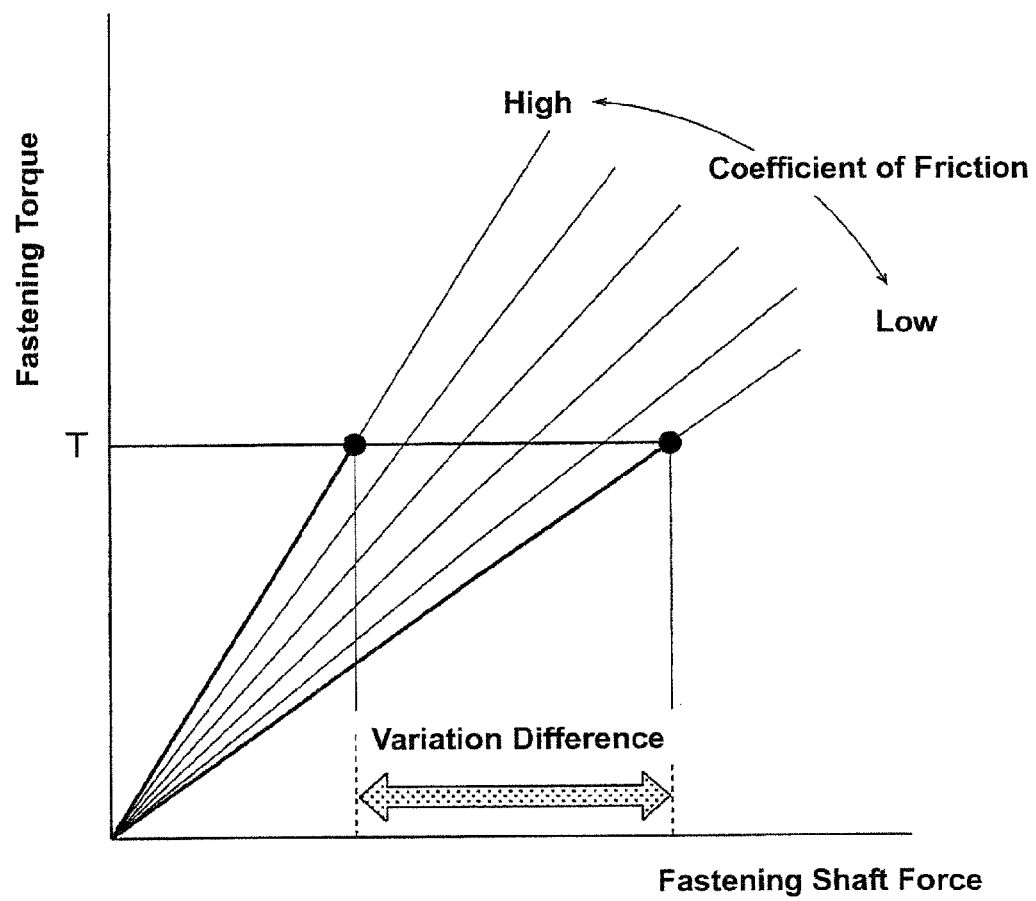
FIG. 11 is an explanatory diagram explaining a bolt fastening method (torque method).

[1] In a bolt fastening method according to the first embodiment, the bolt is fastened to a fastened member (engine bearing parts, for example) with a bolt rotating device such as a nut runner, and a fastened member is fastened with the bolt. Herein, the bolt is fastened up to a predetermined snug torque Ts and then the bolt is further fastened by a specified angle from a bolt angle corresponding to the snug torque Ts (torque+angle method). If the torque method (the method of managing bolt fastening with the fastening torque which utilizes the proportional relationship between the fastening torque and the fastening shaft force (in the elasticity area of bolt)), which is shown in FIG. 11, was applied, the fastening shaft force of the bolt would varies improperly according to the coefficient of friction between the screw face and the seat face of the bolt. The torque+angle method, however, uses additionally the bolt fastening angle (rotational angle) which has proportional relationships with the fastening shaft force and may not be affected by the coefficient of friction of the screw face and the like during bolt fastening. Accordingly, the torque+angle method is applied here (see FIG. 12 showing the general torque and angle method).

Figure 1:
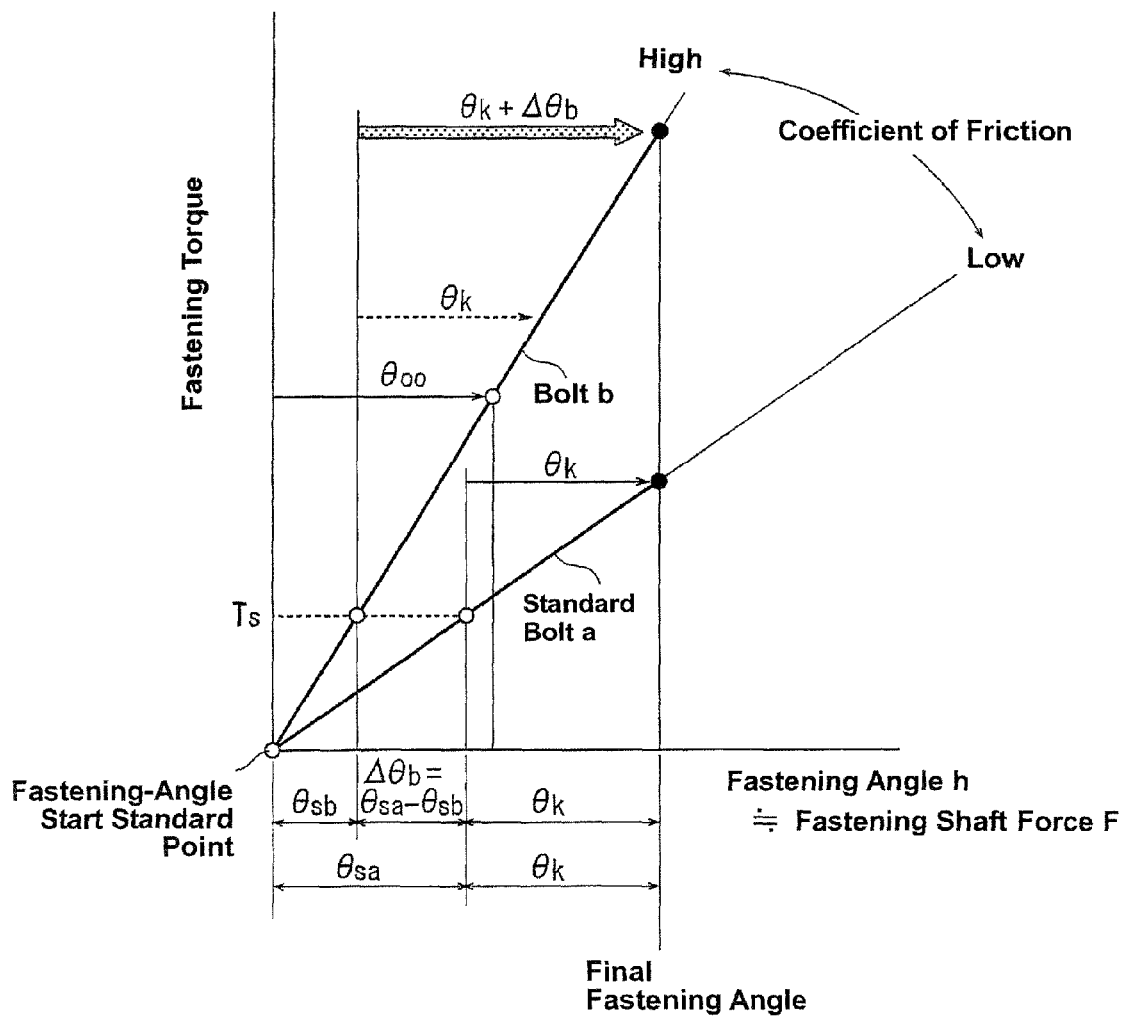
FIG. 1 is an explanatory diagram specifically explaining a bolt fastening method according to a first embodiment.

[2] According to the bolt fastening method of the first embodiment, at first a fastening-angle start standard point is obtained based on torque characteristics of fastening of each of bolts. This is because the fastening angle of each bolt at a point where the fastening torque of the bolt has reached the snug torque Ts is specified under the angle start standard which is common to all bolts. More in detail, the fastening torque and the fastening angle are measured (obtaining the torque characteristics) during the bolt fastening, the torque gradient to the point reaching the snug torque Ts (the rate of change in the fastening torque to change in the fastening angle) is obtained, a torque gradient line is drawn from the point where the above-described torque gradient has been obtained, a point on the torque gradient line where the fastening torque is zero (an intersection with the axis of fastening angle (lateral axis)) is specified as the fastening-angle start standard point (substantially, the fastening angle=0). More specifically, a point which is smaller than the fastening angle point corresponding to the snug torque Ts (the point at the fastening torque=0) by a value of Ts/α will be the fastening-angle start standard point (substantially, the fastening angle=0), wherein α is the torque gradient. In FIG. 1 showing an example which will be described below, the fastening-angle start standard point of each of the plural bolts is illustrated as a single point for simplicity.

[3] Then, according to the bolt fastening method of the first embodiment, the fastening angle of each of the bolts at the point where the fastening torque of the bolt has reached the snug torque Ts from the above-described fastening-angle start standard point is obtained. This is because the degree of influence of the coefficient of friction is objectively specified for each bolt.

Figure 12:
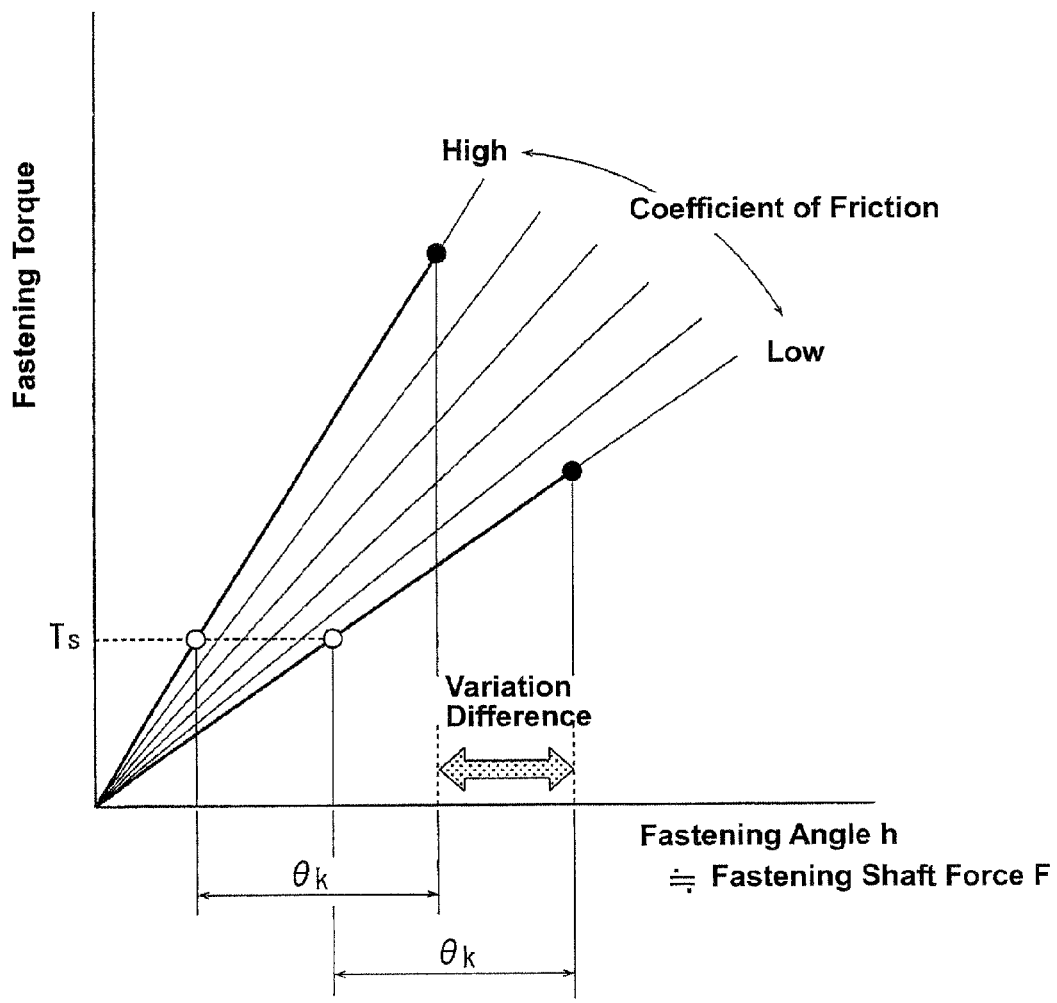
FIG. 12 is an explanatory diagram explaining the bolt fastening method (torque+angle method).

[4] Next, according to the bolt fastening method of the first embodiment, an angle-variation difference between a standard angle of the snug torque Ts and the fastening angle of each bolt at the point where the fastening torque of the bolt has reached the snug torque Ts is obtained for the purpose of correcting the variation in the fastening shaft force to the point reaching the snug torque Ts (see FIG. 12). In the torque+angle method, there may be no influence of the coefficient of friction of the screw face and the like in the fastening area after reaching the snug torque Ts due to its angle method. In the area before reaching the snug torque Ts, however, the torque management of the bolt may cause variation in the fastening shaft force due to the improper influence of the coefficient of friction of the screw face and the like as shown in FIG. 12. This variation may improperly affect the final fastening shaft force. Therefore, an angle-variation difference between a standard angle of the snug torque Ts and the fastening angle of each bolt at the point where the fastening torque of the bolt has reached the snug torque Ts is obtained. That is, in order to correct this, excess and deficiency of the bolt fastening angle at the point reaching the snug torque Ts from the standard angle of the snug torque Ts is obtained. In this case, in case the bolt's fastening angle is smaller than the above-described standard angle (i.e., deficiency), the value of the angle-variation difference is positive (+). Meanwhile, in case the bolt's fastening angle is greater than the above-described standard angle (i.e., deficiency), the value of the angle-variation difference is negative (−).

[5] Then, according to the bolt fastening method of the first embodiment, one of the plurality bolts to be fastened (in case of the presence of plural portions to be attached) is selected as a standard bolt, and the obtained fastening angle of the standard bolt at the point where the fastening torque Ts of the bolt has reached the snug torque from the fastening-angle start standard point is used as the standard angle of the snug torque Ts. Thereby, the fastening shaft force of the other bolt than the standard bolt can be made approximate the fastening shaft force of the standard bolt easily, and the fastening shaft forces of all of the bolts can be made uniform. In this case, the standard bolt can be fastened properly with a specified fastening value (snug torque Ts, the specified angle), and the standard bolt and the specified fastening value may be properly predetermined from experiments (a representative bolt, a representative value).

[6] Next, according to the bolt fastening method of the first embodiment, the above-described specified angle is set at a certain amount of angle which is obtained by adding the angle-variation difference to a base angle (equal to the specified angle of the standard bolt). Thereby, this specified angle with the above-described certain amount is used to fasten the bolt. This is because the final fastening shaft force (fastening angle) of each bolt is made equal to each other by adding the excess and deficiency of the bolt fastening angle at the point reaching the snug torque Ts to the base angle.

[7] The above-described bolt fastening method will be described specifically with the standard bolt a and one other bolt b, referring to FIG. 1. At first, the standard bolt a is selected, the standard bolt a is fastened up to the snug torque Ts under the torque management according to the specified fastening value (the snug torque Ts, the base angle θk), and then the bolt a is further fastened by the specified angle (the base angle) θk from a bolt angle θsa corresponding to the snug torque Ts. The fastening shaft force of the bolt fasted becomes the final fastening shaft force (a final fastening angle: θsa+θk). In this case, the bolt angle θsa corresponding to the snug torque Ts (in FIG. 1, this angle θsa is shown as a fastening angle from the fastening-angle start standard point to the point of the snug torque Ts) is set as the standard angle of the snug torque Ts. This standard angle θsa is memorized for a correction processing of the bolt b. In this case, of course, at first the torque gradient of the characteristics line of the standard bolt a and the fastening-angle start standard point (a point with the fastening angle of zero on the line of the fastening torque=0) is obtained based on the torque gradient obtained, which may be necessary to specify the fastening angle including the above-described standard angle.

Subsequently, the other bolt b than the standard bolt a is fastened. Herein, at first the fastening to the snug torque Ts under the torque management is conducted to the bolt b as well. When the fastening torque has reached to the sung torque Ts, the fastening angle θsb corresponding to the snug torque Ts from the fastening-angle start standard point (in FIG. 1, this angle θsb is shown as a fastening angle from the fastening-angle start standard point to the point of the snug torque Ts) is detected, the difference between the standard angle θsa and the fastening angle θsb, that is, Δθb=θsa−θsb is calculated, then addition of this difference Δθb to the above-described specified angle θk as a base angle, that is, θk+Δθb is set as a new specified angle. The bolt b is further fastened by the specified angle θk+Δθb from the fastening angle θsb corresponding to the snug torque Ts, so that the fastening shaft force of the bolt which has been fastened up becomes the final fastening shaft force (the final fastening angle θsb+θk+Δθb). Thereby, the deficiency of the bolt fastening angle θsb to the point of the snug torque Ts is corrected regarding the fastening angle amount of the bolt b, so that the final fastening shaft force of the bolt b becomes nearly equal to the final fastening shaft force of the standard bolt a as shown in FIG. 1. On the contrary, in case the above-described correction is not made for the bolt b, the bolt fastening of the bolt b may be completed with the fastening angle of the addition of the base angle θk to the fastening angle θsb to the point of the snug torque Ts. In this case, the fastening angle θsb+θk of the bolt b may become smaller than the final fastening angle θsb+θk+Δθb of the standard bolt a (see an arrow shown by a broken line in FIG. 1). In this case, of course, the fastening-angle start standard point is obtained based on the torque gradient of the characteristics line of the bolt b, and the fastening angle of the bolt b is specified (determined) from this fastening-angle start standard point. Herein, according to the present embodiment, an initial fastening angle θ00 for conducting the bolt fastening is set at first to obtain basic data of the bolt fastening. This will be described later.

Figure 2:
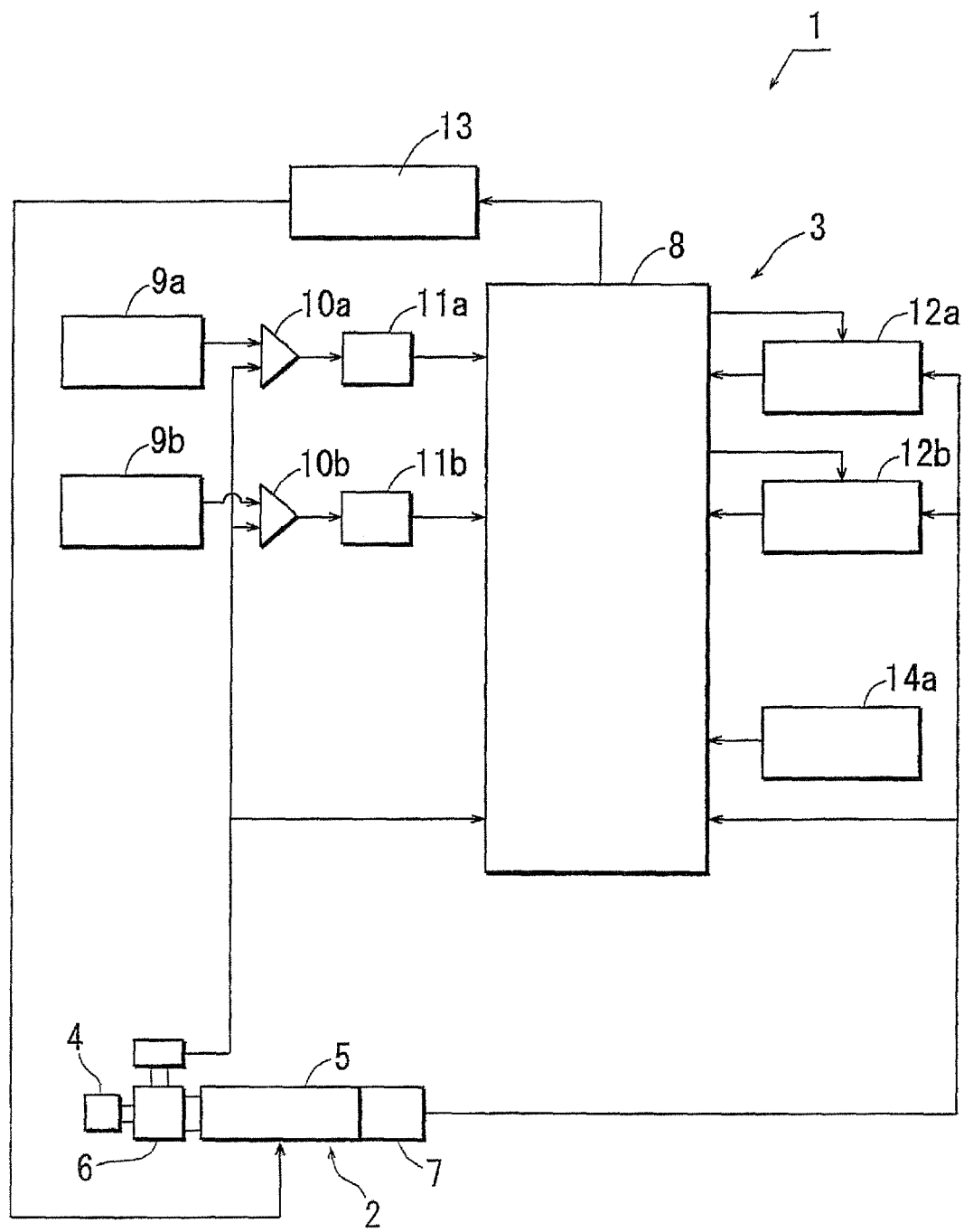
FIG. 2 is a diagram showing a bolt fastening apparatus which uses the bolt fastening method according to the first embodiment.

Hereinafter, a bolt fastening apparatus which uses the method of the above-described first embodiment will be described. The bolt fastening apparatus 1 comprises a nut runner 2 as a bolt rotating means, and a control system 3 to control the nut runner 2 as shown in FIG. 2. The nut runner 2 comprises a socket 4 operative to engage with a head portion of the bolt, a drive motor (bolt fastening adjusting means) 5 operative to rotate the socket 4, a torque transducer (torque detecting means) 6 operative to detect the torque loaded to the bolt by the socket 4, and an angle encoder (fastening angle detecting means) 7 operative to measure the bolt's fastening angle by detecting the rotational angle of the drive motor 5.

The control system 3 comprises a control processor (CPU) 8, which receives a fastening torque signal from the torque transducer 6, a fastening angle signal from the angle encoder 7, and other various information data for the torque-gradient calculation and the fastening by the torque+angle method. At first, the fastening torque signal from the torque transducer 6 and the fastening angle signal from the angle encoder 7 will be described. Measurements of the fastening torque and the fastening angle based on these signals are started at the same time as the start of the bolt fastening. Herein, the fastening angle is specified (determined) from the fastening-angle start standard point (as the fastening angle value 0) after the fastening-angle start standard point has been obtained, which will be described later.

Next, input/output relationships for the torque gradient calculation will be described. The control system 3 comprises a standard torque setter 9a to set a standard torque T0 (fastening torque below the snug torque Ts). A standard torque signal from the standard torque setter 9a and the fastening torque signal of the bolt detected by the torque transducer 6 are inputted to a comparator 10a. The comparator 10a compares the fastening torque signal with the standard torque signal, and outputs an identification signal when both values are identical to each other. The identification signal is inputted to the control processor 8 via an analog gate 11a as a standard torque arrival signal. Meanwhile, the fastening angle signal of the bolt detected by the angle encoder 7 is inputted to the control processor 8 via an angle gate 12a. ON, OFF signals are inputted to the angle gate 12a from the control processor 8. Herein, the ON signal from the control processor 8 is configured to be outputted on the condition that the standard-torque-arrival signal is inputted to the control processor 8. Thereby, the angle gate 12a is turned ON, the control processor 8 (memory means) memorizes the standard fastening angle θ0 at the point of the standard torque T0 (at the fastening start point). Meanwhile, the OFF signal from the control processor 8 is configured to be outputted when the fastening angle which is inputted after the angle gate 21a has turned ON has reached a specified angle which has been set. That is, the control system 3 includes an angle setter 14a to set a fastening angle Δθ1, and the control processor 8 memorizes this angle Δθ1 set by the angle setter 14a. And, when it is determined that the fastening angle from the angle encoder 7 has reached the Δθ1 from the standard fastening angle θ0 (the standard torque T0 arrival point), the control processor 8 outputs the OFF signal to the angle gate 14a and memorizes the fastening torque (fastening torque signal) T1 from the torque transducer 6. Thereby, as described below, the torque gradient α is calculated, and the fastening-angle start standard point, which is the substantial start point of fastening, is obtained with the torque gradient α on the axis of the fastening torque=0.

Subsequently, input/output relationships for the fastening by the torque+angle method will be described. The control system 3 comprises a snug torque setter 9b to set the snug torque Ts. A snug torque signal from the snug torque setter 9b and the fastening torque signal of the bolt detected by the torque transducer 6 are inputted to a comparator 10b. The comparator 10b compares the fastening torque signal with the snug torque signal, and outputs an identification signal when both values are identical to each other. The identification signal is inputted to the control processor 8 via an analog gate 11b as a snug torque arrival signal. Meanwhile, the fastening angle signal of the bolt detected by the angle encoder 7 is inputted to the control processor 8 via an angle gate 12b. ON, OFF signals are inputted to the angle gate 12b from the control processor 8. Herein, the ON signal from the control processor 8 is configured to be outputted on the condition that the snug-torque-arrival signal is inputted to the control processor 8. Thereby, the angle gate 12b is turned ON, the control processor 8 (memory means) memorizes the fastening angle at the point of the snug torque Ts. Meanwhile, the OFF signal from the control processor 8 is configured to be outputted on the condition that the fastening angle has reached a specified angle which is set by a specified-angle setting means, which will be described later, after the input of the snug-torque-arrival signal. Thereby, the control processor (control means) 8 outputs a stop signal to the drive motor 5 via a servo amp 13.

Figure 13:
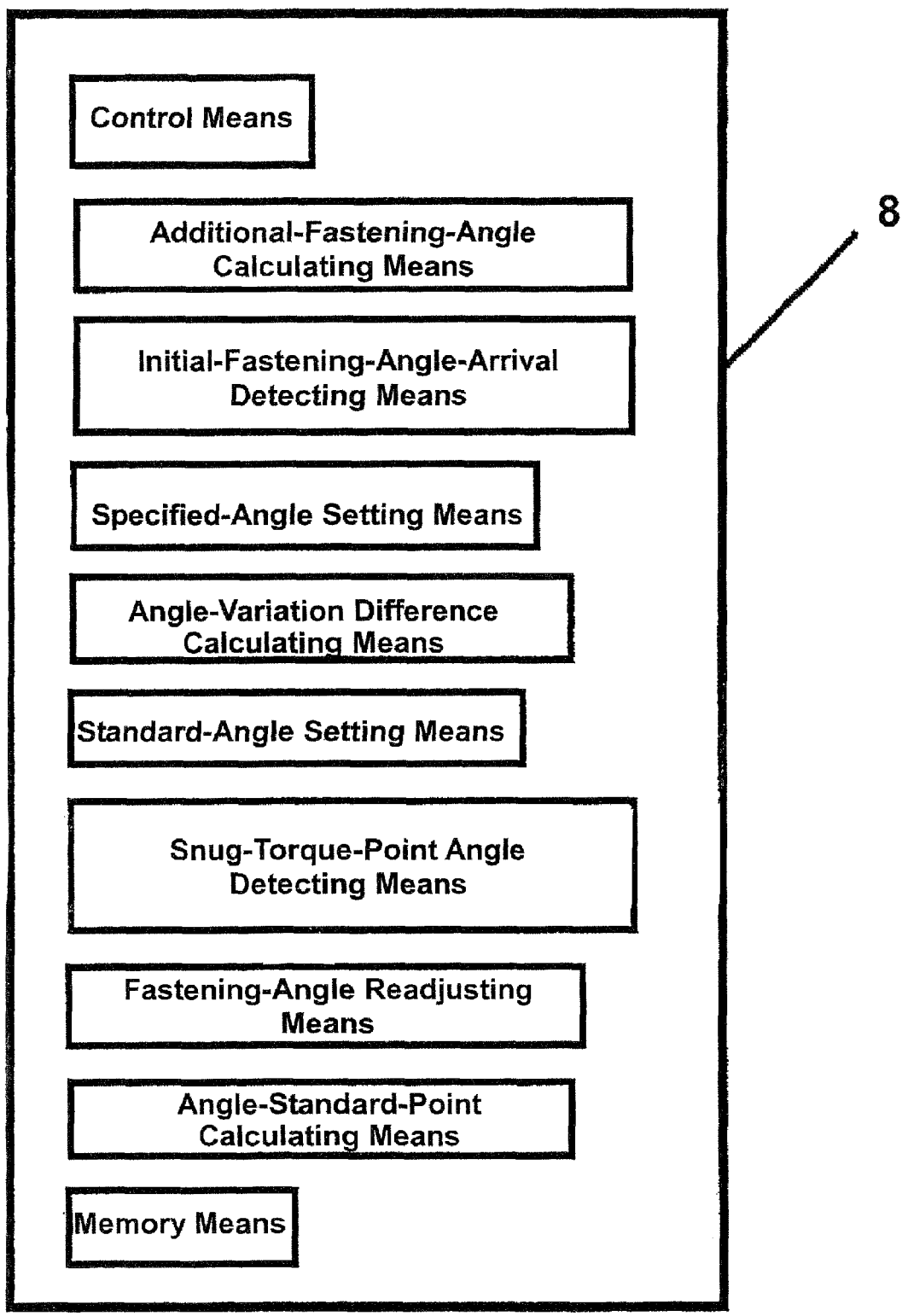
FIG. 13 is a diagram showing means for constituting a control processor according to the first embodiment.

The control processor 8, as shown in FIG. 13, comprises a memory means, angle-standard-point calculating means, fastening-angle readjusting means, snug-torque-point angle detecting means, standard-angle setting means, angle-variation difference calculating means, specified-angle setting means, initial-fastening-angle-arrival detecting means, additional-fastening-angle calculating means, and control means for processing the above-described various input information data.

The memory means memorizes the initial fastening angle θ00, specified angle (base angle) θk, snug torque Ts and other input information data.

The angle-standard-point calculating means receives the standard torque T0, the fastening-angle change Δθ1 from the standard fastening angle θ0 corresponding to the standard torque T0, and the fastening torque T1 corresponding to the Δθ1 as input information, and calculates the torque gradient α based on these input information. That is, the angle-standard-point calculating means reads out Δθ1, T0, T1 from the memory means and calculates the torque gradient α from an equation of α=(T1−T0)/Δθ1. Further, the angle-standard-point calculating means is configured to calculate Ts/α, using the torque gradient α and the snug torque Ts, and specify a point which is this calculated value Ts/α lower than the fastening-angle point corresponding to the snug torque Ts on the axis of fastening angle (lateral axis) in FIG. 1 as the fastening-angle start standard point.

The fastening-angle readjusting means is configured to readjust the fastening angle which is measured from the fastening start and the fastening angle which is measured from this fastening angle measured from the fastening start, setting the fastening-angle value of the fastening-angle start standard point which is obtained by the angle-standard-point calculating means as 0 (zero).

The snug-torque-point angle detecting means is configured to detect the fastening angle at the point where the fastening torque of the bolt has reached the snug torque Ts among the fastening angles (from the fastening-angle start standard point) which are adjusted by the fastening-angle readjusting means.

The standard-angle setting means is configured to memorize the fastening angle at the point of the snug torque Ts which is detected by the snug-torque-point angle detecting means as the standard angle to correct the fastening for the standard bolt (the first bolt to be fastened is set as the standard bolt).

The angle-variation difference calculating means, which is provided for the purpose of calculating the excess and deficiency of the fastening angle up to the snug torque Ts for the second and more bolts (other bolts than the first bolt), is configured to obtain an angle-variation difference between the fastening angle of the second and more bolts at the points of the snug torque Ts which are detected by the snug-torque-point angle detecting means and the standard angle of the first standard bolt at the point of the snug torque Ts which is detected by the snug-torque-point angle detecting means. Herein, the angle-variation difference for the first standard bolt is configured to be 0 (zero).

The specified-angle setting means, which is provided for the purpose of making the specified angle affect the above-described excess and deficiency of the fastening angle, is configured to set the specified angle at a certain amount of angle $\theta t$ which is obtained by adding the angle-variation difference obtained by the angle-variation difference calculating means to the base angle $\theta k$. Herein, the base angle $\theta k$ is a fixed value which is previously memorized at the control processor 8.

The initial-fastening-angle-arrival detecting means and the additional-fastening-angle calculating means are newly provided for the first embodiment. According to the first embodiment, the bolt fastening is conducted up to the initial fastening angle $\theta 00$ at first, and then a correction control for the deficiency which may be caused by this initial fastening angle $\theta 00$ is executed. Accordingly, the initial-fastening-angle-arrival detecting means is configured to detect that the fastening angle has arrived to the initial fastening angle $\theta 00$ from the fastening-angle start standard point obtained by the angle-standard-point calculating means. Meanwhile, the additional-fastening-angle calculating means is configured to calculate $\theta s$ (fastening angle at the point of the snug torque: which is a deficiency angle caused by the initial fastening angle $\theta 00$)+$\Delta \theta$ (correction value)+$\theta k$(base angle)−$\theta 00$ (initial fastening angle) as an additional fastening angle. Herein, of course, instead of providing the initial-fastening-angle-arrival detecting means and the additional-fastening-angle calculating means, the specified-angle setting means may be made set (calculate) a new specified angle before reaching the initial fastening angle and the fastening with this new specified angle may be executed from the point of the snug torque Ts.

The control means, which conducts the control with the initial-fastening-angle-arrival detecting means and the additional-fastening-angle calculating means, is configured to output the drive stop signal to the drive motor via the servo amp 13 when the initial-fastening-angle-arrival detecting means detects the arrival at the initial fastening angle $\theta 00$, and then after completion of the calculation by the additional-fastening-angle calculating means, to output again the drive signal to the drive motor 5 via the servo amp 13, thereby further fastening the bolt by the calculated additional fastening angle with the nut runner 2.

Figure 3:
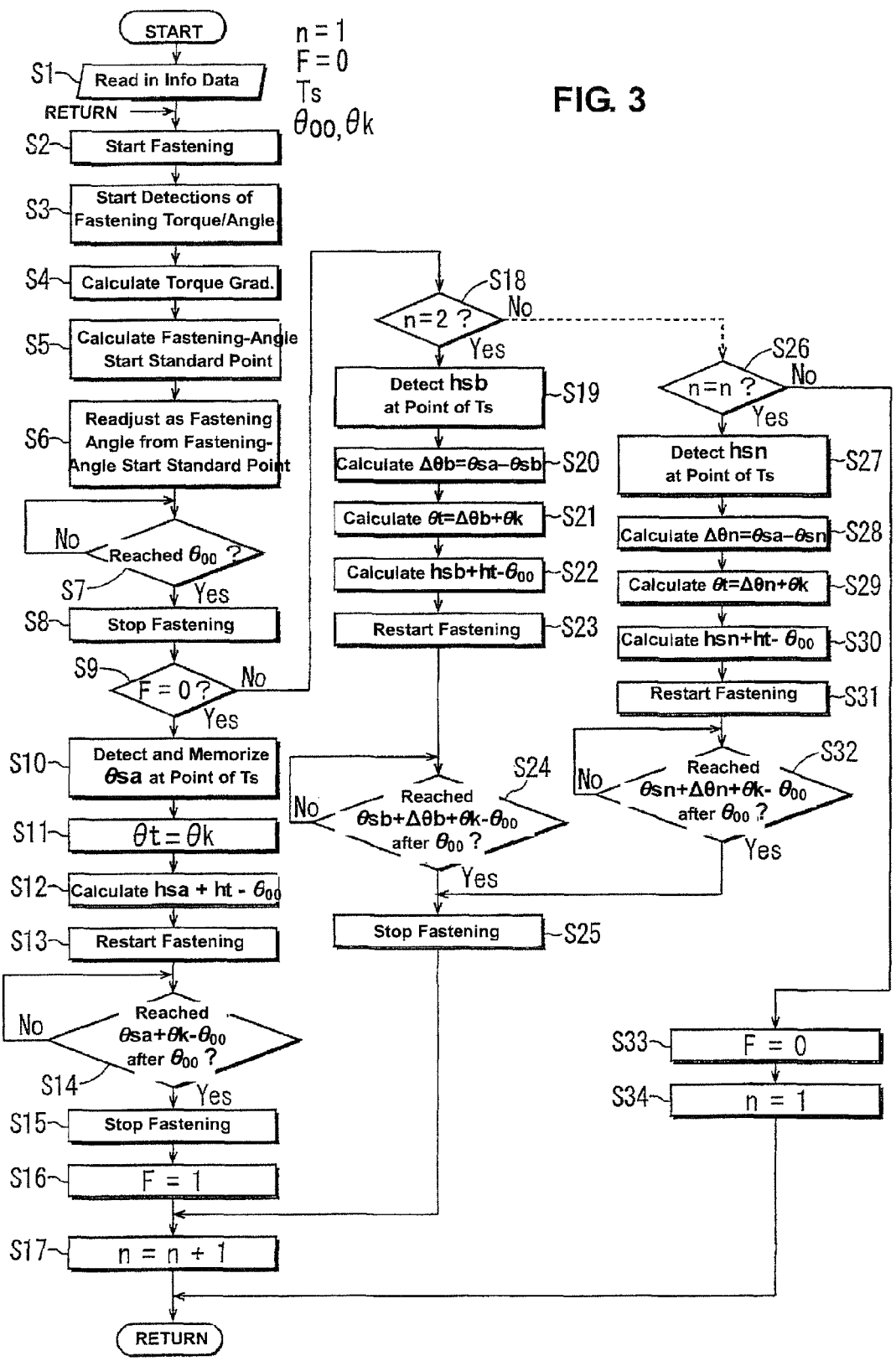
FIG. 3 is a flowchart showing an exemplified control of the bolt fastening apparatus using the bolt fastening method according to the first embodiment.

Hereinafter, an example of the control of the above-described bolt fastening apparatus 1 will be specifically described referring to the flowchart shown in FIG. 3. Herein, in an object product to be fastened with bolts, the number of bolts and the order of fastening bolts including the standard bolt a to be fastened at first are previously determined At first, in S1 (S denotes a step) which follows an operation start of the bolt fastening apparatus 1, various information data is read in. The information to be read in includes the snug torque Ts, the specified angle $\theta t$=the base angle $\theta k$, the first bolt of the numbers n of bolts to be fastened (n=1), and flag F=0. The flag F indicates whether or not the fastening processing is for the standard bolt to be fastened at first. F=0 indicates the fastening processing for the standard bolt a, and F=1 indicates the fastening processing for the other bolt than the standard bolt.

Next, the bolt fastening is started by the drive of the nut runner 2, and accordingly the detections of the fastening torque and angle are started (S2, S3). The torque characteristics line (fastening torque–fastening angle) is obtained based on the detection data of S3, and the torque gradient is obtained according to the torque characteristics line (S4). Then, the fastening-angle start standard point of the substantial fastening angle=0 is calculated based on this torque gradient as described above (S5). Next, the fastening angle from the start point of the bolt fastening is readjusted as the one from the fastening-angle start standard point, and this readjusted fastening angle is made be associated with the fastening torque (S6: readjustment of data).

When the fastening angle of the bolt has reached the initial fastening angle $\theta 00$, the drive of the nut runner 2 is stopped (S7, S8), and it is determined whether F=0 or not (S9). Herein, since the standard bolt a is set as the bolt to be fastened at first (the nut runner 2 is moved to the standard bolt a by a robot or the like), the answer to the determination in S9 is YES. Thus, subsequently, the fastening angle $\theta sa$ of the standard bolt a at the point of the snug torque Ts (from the fastening-angle start standard point) is detected, and this fastening angle $\theta sa$ is memorized as the standard angle of the snug torque Ts (S10). Specifically, on the condition that the snug-torque arrival signal is inputted to the control processor 8, the control processor 8 outputs the ON signal to the angle gate, and the fastening angle at the point of the snug torque Ts is memorized by the control processor 8 (standard angle setting means). Herein, the fastening angle $\theta sa$ which has been readjusted as the angle from the fastening-angle start standard point is memorized again as the standard angle of the snug torque Ts. Then, it is set that the specified angle $\theta t$=$\theta k$ (base angle) (S11), and the final fastening angle $\theta st$+$\theta t$ of the standard bolt a is obtained.

In the present embodiment, the deficiency $\theta sa$+$\theta t$−$\theta 00$ is calculated in the next S12 to utilize the initial fastening angle $\theta 00$ which has been already fastened. Then, the nut runner 2 is driven again (S13). Herein, the bolt fastening of this deficiency angle $\theta sa$+$\theta t$−$\theta 00$ is conducted, and then after this fastening is completed, the fastening of the nut runner 2 is stopped (S14, S15). Herein, F=1 is set in S16, and then increment of the bolt number n is executed. Then, the control sequence returns.

After the return, the above-described steps of S2-S9 are executed for the second bolt as well. Herein, since the second bolt is not the standard bolt, the answer to the determination in S9 is NO. Accordingly, it is determined whether the bolt to be fastened is the second bolt (the bolt b) or not in S18. When the answer to S18 is YES, the fastening angle $\theta sa$ of the standard bolt b at the point of the snug torque Ts (from the fastening-angle start standard point) is detected in S19. Then, the difference $\Delta \theta b$=$\theta sa$−$\theta sb$ is calculated (S20), and the new specified angle $\theta t$ is set as $\theta t$=$\Delta \theta b$+$\theta k$, by adding the base angle $\theta k$ to this difference $\Delta \theta b$ (S21). Herein, likewise, the deficiency $\theta sb$+$\theta t$−$\theta 00$=$\theta sb$+$\Delta \theta b$+$\theta k$−$\theta 00$ is calculated in the next S22 to utilize the initial fastening angle $\theta 00$ which has been already fastened. Then, the nut runner 2 is driven again (S23). Herein, the bolt fastening of this deficiency angle $\theta sb+\theta t-\theta 00=\theta sb+\Delta\theta b+\theta k-\theta 00$ is conducted, and then after this fastening is completed, the fastening of the nut runner 2 is stopped (S24, S25). Herein, F=1 is set in S17, and then increment of the bolt number n is executed. Then, the control sequence returns.

Subsequently, processing of S26-S32, which are similar to the above-described S18-S24, and S25, S17 are repeated up to the number n bolt. When the processing for all bolts is complete, the answer to the determination of S26 will be NO. Accordingly, the flag F will be set at 0 in S33, and the number n will be set at 1 in S34, resulting in being ready for the bolt fastening of a new object product.

Figure 4:
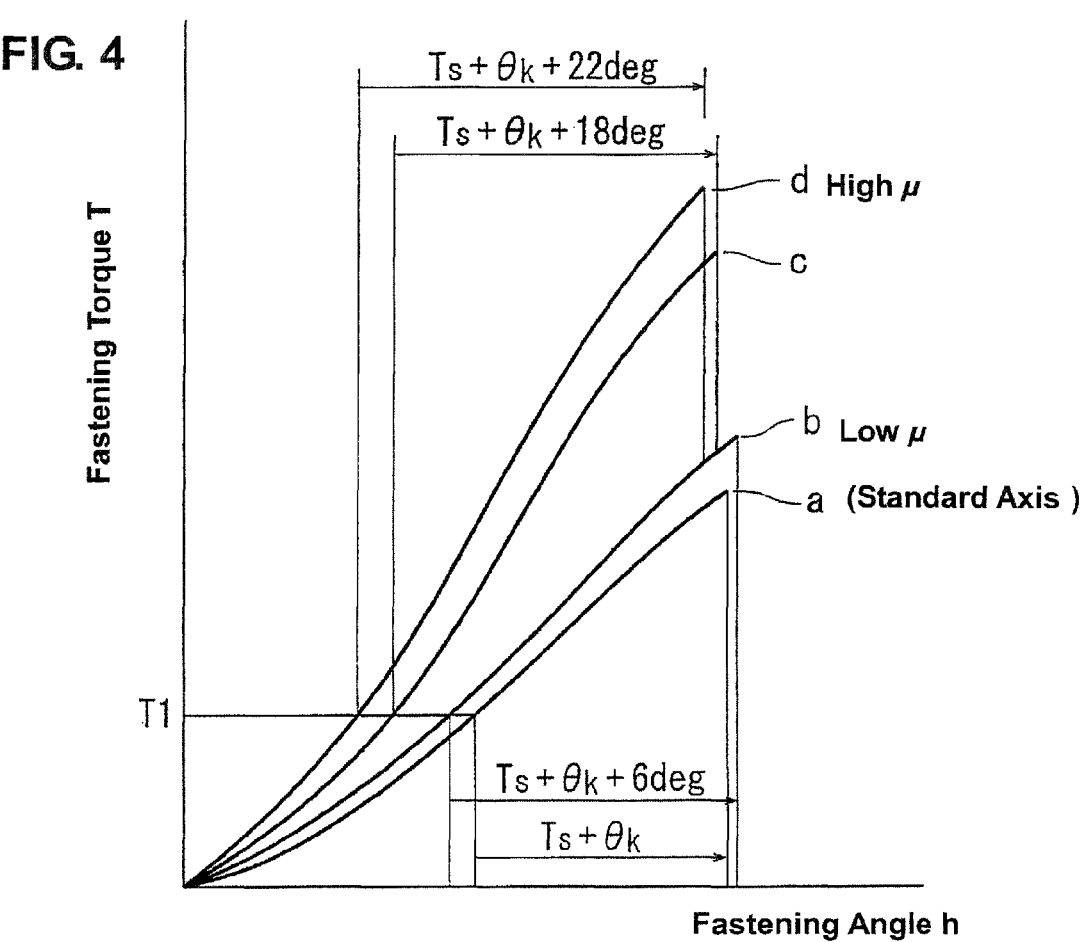
FIG. 4 is an explanatory diagram explaining results of an exemplified experiment which uses the bolt fastening method according to the first embodiment.
Figures 6, 7:
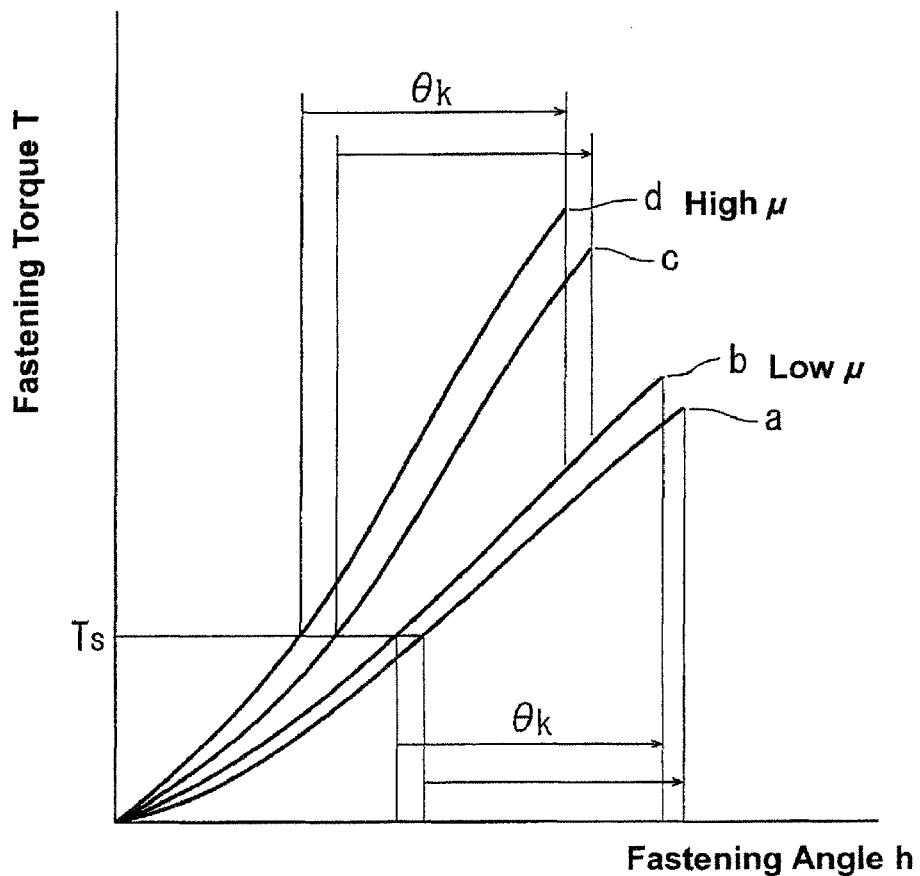
FIG. 6 is an explanatory diagram explaining results of an exemplified experiment which uses a conventional bolt fastening method (torque+angle method).
FIG. 7 is a diagram showing specific results of the experiment of FIG. 6.

FIGS. 4 and 5 show exemplified experiments which use the bolt fastening method according to the first embodiment. FIGS. 6 and 7 show exemplified experiments which use the conventional bolt fastening method (the bolt is further fastened by the fixed specified angle $\theta k$ from the angle at the point of the snug torque Ts). The bolt fastening method according to the first embodiment showed a much better (about three times) stability of the shaft force than the conventional method. Herein, the steel bolt and the aluminum member as the fastened member were used.

Embodiment 2

Figure 8:
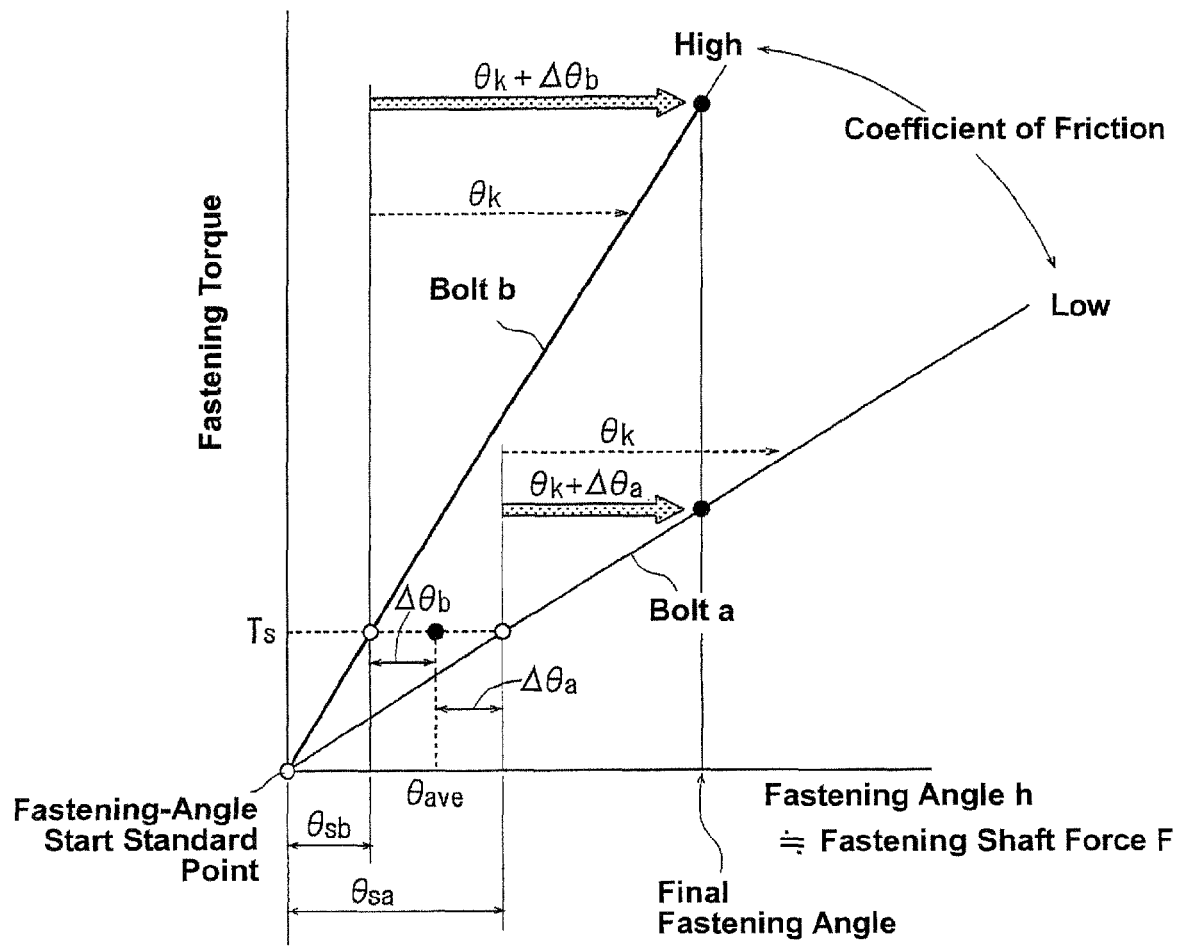
FIG. 8 is an explanatory diagram specifically explaining a bolt fastening method according to a second embodiment.

Hereinafter, a bolt fastening method according to a second embodiment will be described. Herein, like the above-described first embodiment, the torque+angle method is applied in which the difference $\Delta\theta$, and the addition of this difference $\Delta\theta b$ to the base angle $\theta k$ is set as the new specified angle. According to the bolt fastening method according to the second embodiment, however, the fastening angles of a plurality of bolts to be fastened at the point where the fastening torque of each bolt has reached the snug torque Ts are detected, an average angle $\theta ave$ of the obtained fastening angles of the plurality of bolts is obtained, and the average angle $\theta ave$ is used as the standard angle. Thereby, the correction of the fastening shaft force of the bolts can be properly achieved regardless of presence of the plural bolts to be fastened, so that the fastening shaft forces of the plural bolts can be made uniform. In this case, part of all of the bolts which are to be fastened can be selected as the above-described plural bolts. This is because the obtaining of the average angle can be made easier, and some bolts which show too large or small fastening angle thereof may be excluded from the bolts for getting the average angle so that the appropriate average angle are obtained. Further, the selected plural bolts can be fastened almost at the same time so that they can reach the snug torque. Also, the fastening shaft forces of the plural bolts can be made uniform, achieving the efficient fastening step of the bolts The bolt fastening method according to the second embodiment will be described with the bolts a, b referring to FIG. 8. At first, all of the bolts a, b are fastened at the same time, respective fastening angles $\theta sa$, $\theta sb$ of the bolts a, b at the point of the snug torque Ts are detected. Then, the average value $\theta ave=(\theta sa+\theta sb)/2$ is calculated, which is set as the base angle $\theta ave$. Subsequently, the difference between this base angle $\theta ave$ and the respective fastening angles $\theta sa$, $\theta sb$ of the bolts a, b at the point of the snug torque Ts are obtained as $\Delta\theta a=\theta ave-\theta sa$, $\Delta\theta b=\theta ave-\theta sb$. The base angle $\theta k$ is respectively added to each difference $\Delta\theta a$, $\Delta\theta b$, so that respective new specified angles $\theta k+\Delta\theta a$, $\theta k+\Delta\theta b$ are set for the bolts a, b. Thus, the bolt a is further fastened by this new specified angle $\theta k+\Delta\theta a$ from the fastening angle $\theta sa$ at the point of the sung torque Ts, and its final fastening angle will be $\theta sa+\theta k+(\theta ave-\theta sa)$. Likewise, the bolt b is further fastened by the new specified angle $\theta k+\Delta\theta b$ from the fastening angle $\theta sb$ at the point of the sung torque Ts, and its final fastening angle will be $\theta sb+\theta k+(\theta ave-\theta sb)$. As a result, the both fastening angles (fastening shaft forces) are made almost uniform as shown in FIG. 7. On the contrary, in case the correction is not made and thereby the bolts are merely fastened by the base angle $\theta k$ after reaching the snug torque Ts, the final fastening angle ($\theta sa+\theta k$) of the bolt a may become larger than that in the above-described correction case (see an arrow illustrated by a broken line in FIG. 8), while the fastening angle ($\theta sb+\theta k$) of the bolt b may become smaller than that in the above-described correction case (see an arrow illustrated by a broken line in FIG. 8). In this case, like the first embodiment, the fastening-angle start standard point is obtained based on the torque gradient of the characteristics line of each bolt a, b and the fastening angles of the bolts a, b are specified (determined) from the fastening-angle start standard point.

Next, a bolt fastening apparatus 10 using the second embodiment will be described. In the bolt fastening apparatus 10, the same components as the bolt fastening apparatus 1 using the first embodiment are denoted by the same reference characters, detailed description of which are omitted here.

Figure 9:
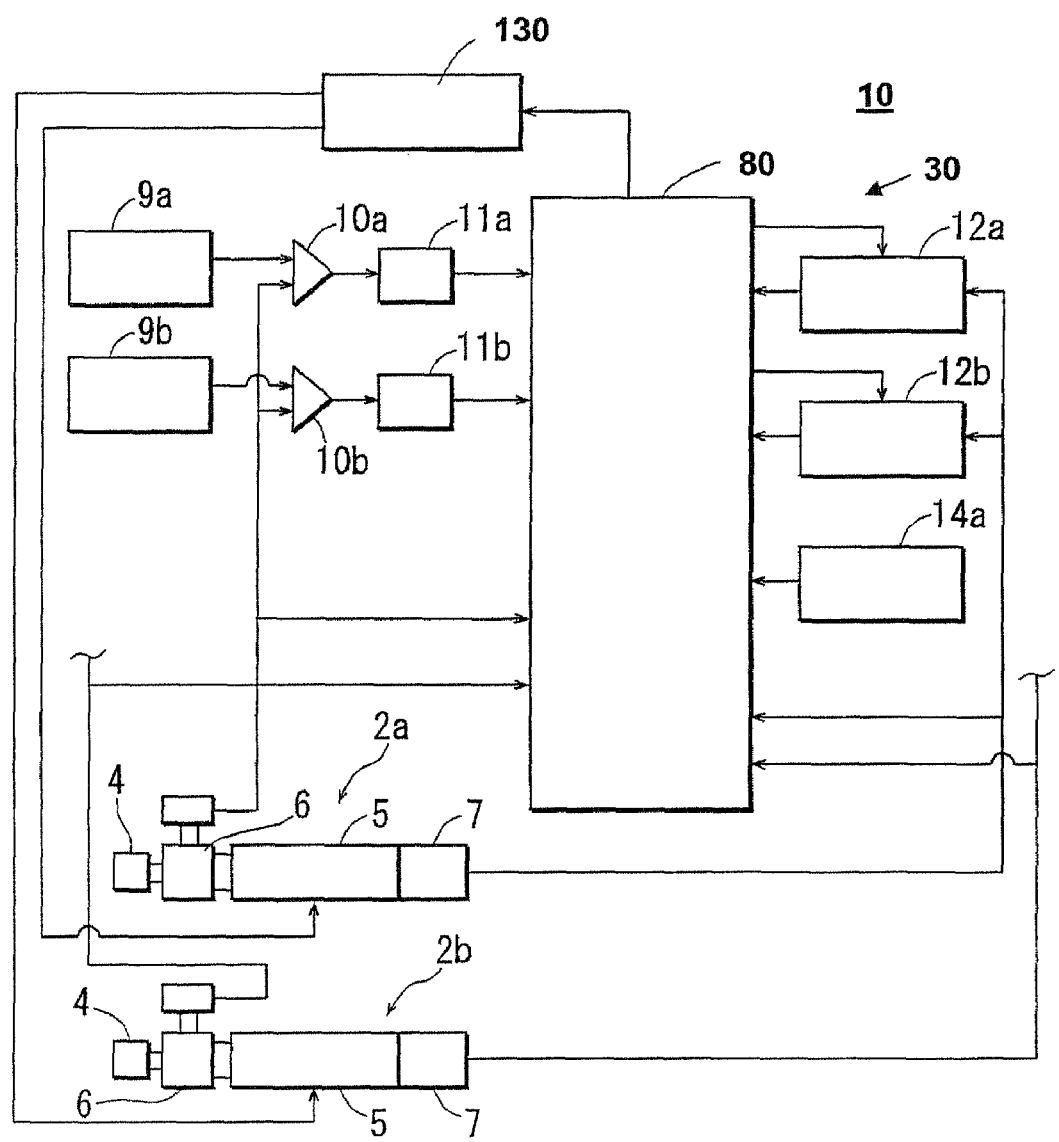
FIG. 9 is a diagram showing a bolt fastening apparatus which uses the bolt fastening method according to the second embodiment.
Figure 14:
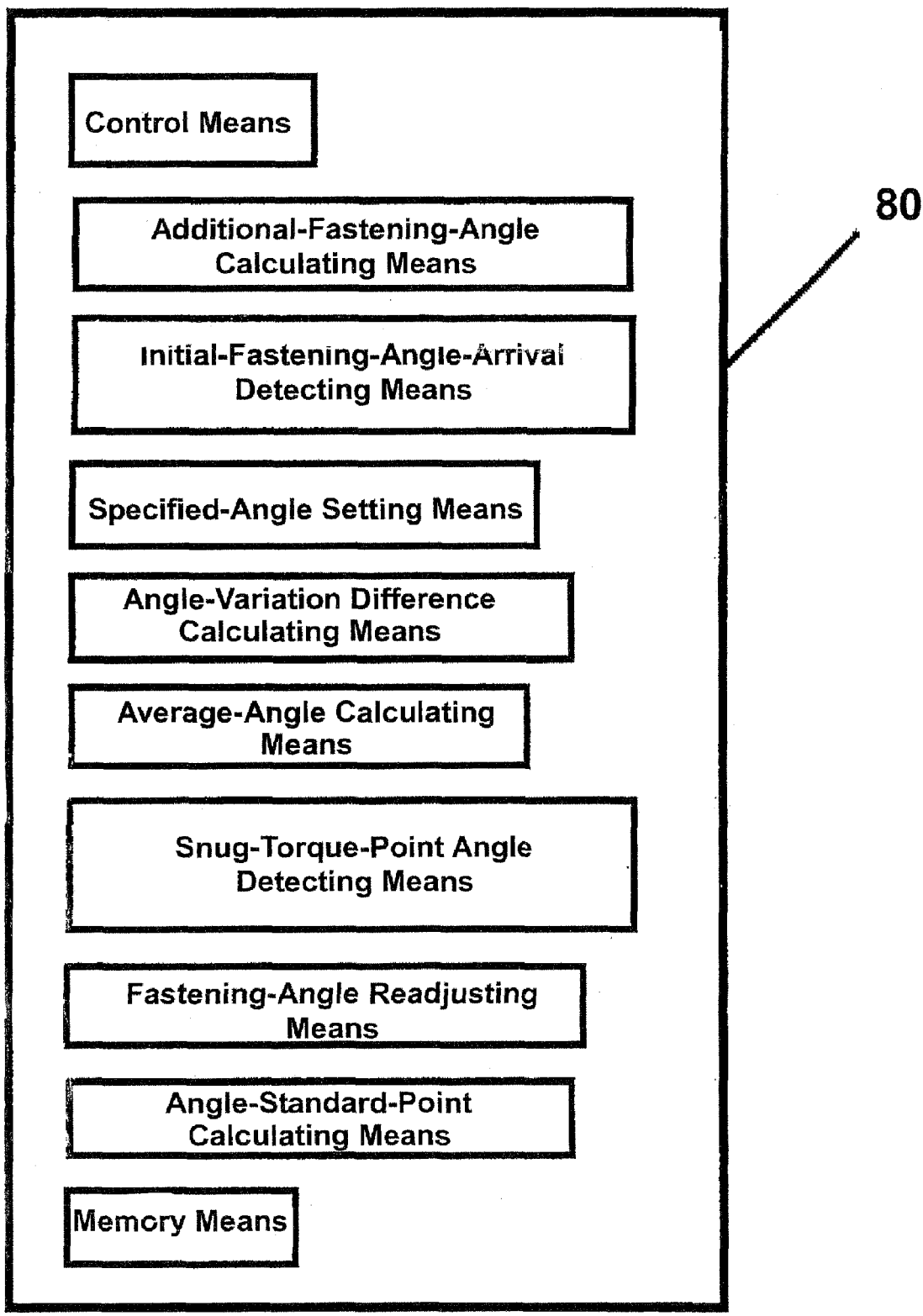
FIG. 14 is a diagram showing means for constituting a control processor according to the second embodiment.

The bolt fastening apparatus 10, as shown in FIG. 9, comprises a plurality of nut runners 2a, 2b, . . . to fasten the plural bolts a, b, . . . at the same time (two of them are just illustrated in FIG. 9 as representatives). Accordingly, a control system 30 comprises, for each nut runner 2a (2b . . . ), the standard torque setter 9a to set the standard torque T0, the snug torque setter 9b to set the snug torque Ts, and related components (comparators 10a, 10b, analogue gates 11a, 11b, angle gates 12a, 12b, and angle setter 14a to set the fastening angle $\Delta\theta 1$). A control processor 80, as shown in FIG. 14, comprises an average-angle calculating means in addition to the memory means, angle-standard-point calculating means, fastening-angle readjusting means, snug-torque-point angle detecting means, angle-variation difference calculating means, specified-angle setting means, initial-fastening-angle-arrival detecting means, additional-fastening-angle calculating means, and control means which are similar to the first embodiment. This average-angle calculating means reads the fastening angles $\theta sa$, $\theta sb$, . . . at the point the fastening angle has reached the snug torque Ts, and calculates the average angle $\theta ave$ which is set as the standard angle in the present embodiment. The angle-variation difference calculating means calculate respective differences between the standard angle $\theta ave$ and the fastening angles $\theta sa$, $\theta sb$, . . . of the bolts a, b, . . . at the point the fastening angle has reached the snug torque Ts, that is, $\Delta\theta a=\theta ave-\theta sa$, $\Delta\theta b=\theta ave-\theta sb$, . . . . The specified-angle setting means set, by using the differences $\Delta\theta a$, $\Delta\theta b$, . . . , new specified angles $\theta k+\Delta\theta a$, $\theta k+\Delta\theta b$, . . . for each of the bolts a, b . . . . The control means outputs the drive stop signals for the bolts a, b, . . . to the drive motors 5 via the servo amp 13 when the bolts are further fastened by the new specified angles $\theta k+\Delta\theta a$, $\theta k+\Delta\theta b$, . . . from the fastening angles at the point of the snug torque Ts (specifically, the bolts are fastened up to the initial fastening angle $\theta 00$, and then fastened by the deficiency amount of angle further. Further, the control means are configured to output the drive signals to the drive motors 5 of the bolts a, b, . . . via respective servo amps 130 at the same time so that the fastening of the bolts a, b, . . . can be started at the same time after the nut runners 2a, 2b, . . . have been prepared for each of the bolts a, b, . . . .

Figure 10:
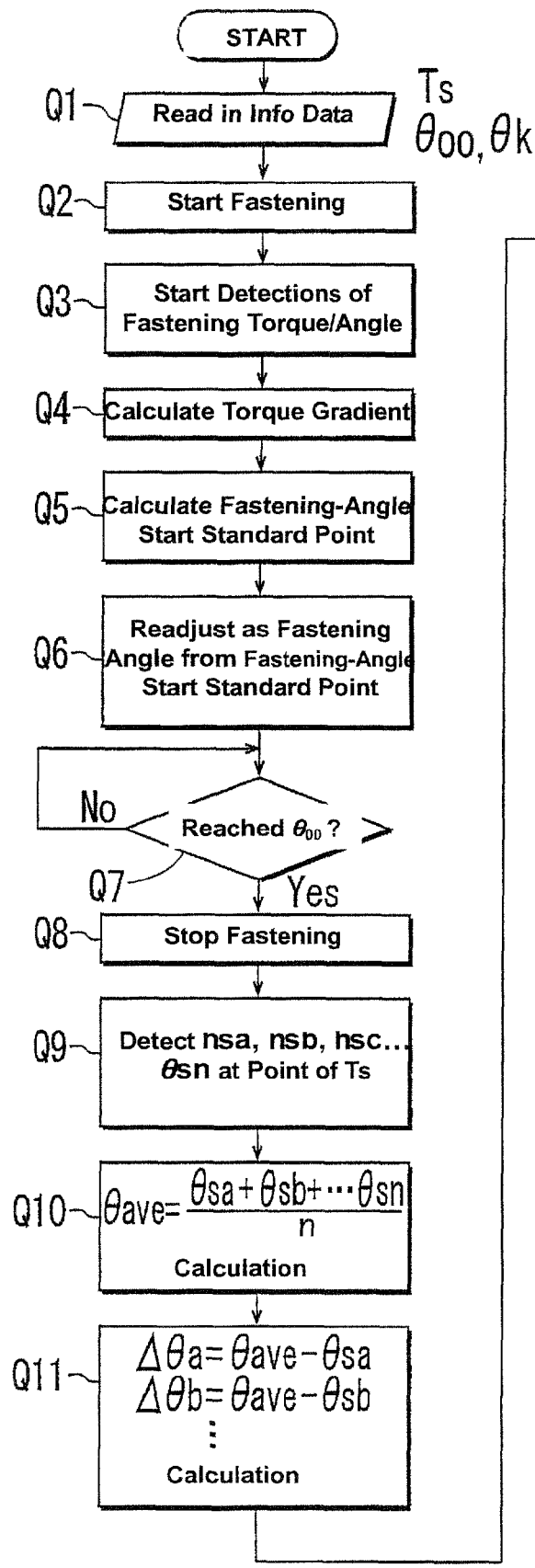
FIG. 10 is a flowchart showing an exemplified control of the bolt fastening apparatus using the bolt fastening method according to the second embodiment.
Figure 10:
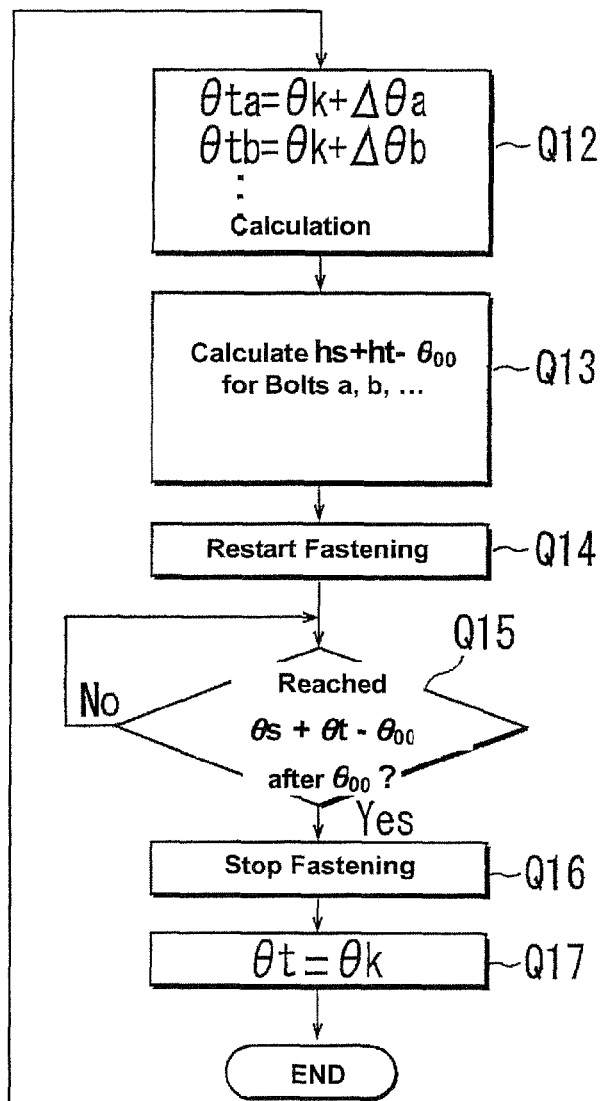

Hereinafter, an example of the control of the bolt fastening apparatus 10 according to the second embodiment will be specifically described referring to the flowchart shown in FIG. 10. Likewise, in the object product to be fastened with bolts, the number of bolts and others are previously determined.

At first, when the operation of the bolt fastening apparatus 10 starts, for the respective bolts a, b, . . . n, processing Q1-Q8 which are similar to the processing S1-S8 of the first embodiment are executed. When the fastening angles of the blots have reached the initial fastening angle θ00 from the fastening-angle start standard point respectively, the fastening by the nut runners 2 are stopped. Subsequently, in Q9 the fastening angles θsa, θsb, . . . at the point of the snug torque Ts are detected for the respective bolts a, b, . . . n, and the average angle θave=(θsa+θsb+ . . . θn)/n is calculated (Q10). Then, the respective differences Δθa=θave−θsa, Δθb=θave−θsb, . . . for the bolts a, b . . . are calculated (Q11). Next, additions of the base angle θk to the respective differences Δθa, Δθb, . . . are calculated, and these are set respectively as new specified angles θta=θk+Δθa, θtb=θk+Δθb, . . . θtn=θk+ΔΘn in place of the specified angle θt=θk (Q12).

In the second embodiment, likewise, the deficiency θs (fastening angle at the snug torque Ts)+θt−θ00, that is, θsa+θk+Δθa−θ00 for the bolt a, θsb+θk+Δθb−θ00 for the bolt b, . . . are respectively calculated in the next Q13 to utilize the initial fastening angle θ00 which has been already fastened, and after these calculations are completed, the fastening of the respective bolts a, b, . . . are restarted (Q14). Then, when the fastening of the deficiency θs+θt−θ00 is finished for each of bolts a, b, . . . (Q15), the drive of each nut runner 2 for fastening of bolts is stopped in order (Q16). After the fastening stop of the bolts a, b, . . . , each specified angle θt (θta, θtb, . . . 74 tn) is retuned to the base angle θk (Q17).

The present invention should not be limited to the above-described embodiments, and any other modifications and improvements may be applied within the scope of a sprit of the present invention.

What is claimed is:

1. A bolt fastening method, in which plural bolts are fastened up to a predetermined snug torque and then the bolts are further fastened by a specified angle from a bolt angle corresponding to the snug torque, the method comprising steps of:
   obtaining a fastening-angle start standard point based on torque characteristics of fastening of the bolts;
   selecting a specified bolt among the plural bolts as a standard bolt;
   obtaining a standard fastening angle of said standard bolt at a point where a fastening torque of the standard bolt has reached the snug torque from said fastening-angle start standard point;
   obtaining a fastening angle of the bolt to be fastened at a point where a fastening torque of the bolt to be fastened has reached the snug torque from said fastening-angle start standard point;
   obtaining an angle-variation difference between said standard fastening angle of the standard bolt and said fastening angle of the bolt to be fastened; and
   setting said specified angle to be additionally fastened for the bolt to be fastened at a certain amount of angle which is obtained by adding said angle-variation difference to a base angle of the specified angle.

2. A bolt fastening method in which plural bolts are fastened up to a predetermined snug torque and then the bolts are further fastened by a specified angle from a bolt angle corresponding to the snug torque, the method comprising steps of:
   obtaining a fastening-angle start standard point based on torque characteristics of fastening of the bolts;
   obtaining an average of respective fastening angles of the bolts at each point where each fastening torque of the bolts has reached the snug torque from said fastening-angle start standard point;
   obtaining a fastening angle of the bolt to be fastened at a point where the fastening torque of the bolt to be fastened has reached the snug torque from said fastening-angle start standard point;
   obtaining an angle-variation difference between said average of respective fastening angles of the bolts and said fastening angle of the bolt to be fastened; and
   setting said specified angle to be additionally fastened for the bolt to be fastened at a certain amount of angle which is obtained by adding said angle-variation difference to a base angle of the specified angle.

3. The bolt fastening method of claim 2, wherein said bolts for obtaining said average are part of bolts which are selected from all of the bolts to be fastened.

4. The bolt fastening method of claim 3, wherein said selected plural bolts are fastened substantially at the same time.

5. A bolt fastening apparatus, in which plural bolts are fastened up to a predetermined snug torque and then the bolts are further fastened by a specified angle from a bolt angle corresponding to the snug torque, the apparatus comprising:
   a bolt-fastening adjusting means for adjusting fastening of the bolts;
   an angle-start-standard-point calculating means for obtaining a fastening-angle start standard point based on torque characteristics of fastening of the bolts;
   a standard-bolt selecting means for selecting a specified bolt among the plural bolts as a standard bolt;
   a first snug-torque-point angle detecting means for obtaining a standard fastening angle of said standard bolt at a point where a fastening torque of the standard bolt has reached the snug torque from said fastening-angle start standard point obtained by said angle-start-standard-point calculating means;
   a second snug-torque-point angle detecting means for obtaining a fastening angle of the bolt to be fastened at a point where a fastening torque of the bolt to be fastened has reached the snug torque from the fastening-angle start standard point obtained by said angle-start-standard-point calculating means;
   an angle-variation difference calculating means for obtaining an angle-variation difference between the standard fastening angle of the standard bolt which is obtained by said first snug-torque-point angle detecting means and the fastening angle of the bolt to be fastened which is obtained by said second snug-torque-point angle detecting means;
   a specified-angle setting means for setting said specified angle to be additionally fastened for the bolt to be fastened at a certain amount of angle which is obtained by adding the angle-variation difference obtained by said angle-variation difference calculating means to a base angle of the specified angle; and
   a control means for controlling said bolt-fastening adjusting means such that the bolt to be fastened is further fastened by the specified angle with the certain amount of angle which is set by said specified-angle setting means.

6. A bolt fastening apparatus, in which plural bolts are fastened up to a predetermined snug torque and then the bolts are further fastened by a specified angle from a bolt angle corresponding to the snug torque, the apparatus comprising:

a bolt-fastening adjusting means for adjusting fastening of the bolts;

an angle-start-standard-point calculating means for obtaining a fastening-angle start standard point based on torque characteristics of fastening of the bolts;

an average calculating means for obtaining an average of respective fastening angles of the bolts at each point where each fastening torque of the bolts has reached the snug torque from the fastening-angle start standard point obtained by said angle-start-standard-point calculating means;

a snug-torque-point angle detecting means for obtaining a fastening angle of the bolt to be fastened at a point where the fastening torque of the bolt to be fastened has reached the snug torque from the fastening-angle start standard point obtained by said angle-start-standard-point calculating means;

an angle-variation difference calculating means for obtaining an angle-variation difference between the average of respective fastening angles of the bolts which is obtained by said average calculating means and the fastening angle of the bolt to be fastened which is obtained by said snug-torque-point angle detecting means;

a specified-angle setting means for setting said specified angle to be additionally fastened for the bolt to be fastened at a certain amount of angle which is obtained by adding the angle-variation difference obtained by said angle-variation difference calculating means to a base angle of the specified angle; and a control means for controlling said bolt-fastening adjusting means such that the bolt to be fastened is further fastened by the specified angle with the certain amount of angle which is set by said specified-angle setting means.

7. The bolt fastening apparatus of claim 6, wherein said control means is configured to control the bolt-fastening adjusting means such that fastening of the plural bolts up to the snug torque is started substantially at the same time.

* * * * *